(12) United States Patent
Tamura

(10) Patent No.: US 9,346,359 B2
(45) Date of Patent: May 24, 2016

(54) VEHICLE INFORMATION PROVISION DEVICE

(71) Applicant: NIPPON SEIKI CO., LTD., Niigata (JP)

(72) Inventor: Shigeaki Tamura, Niigata (JP)

(73) Assignee: Nippon Seiki Co., Ltd., Nigata (JP)

( * ) Notice: Subject to any disclaimer, the term of this patent is extended or adjusted under 35 U.S.C. 154(b) by 0 days.

(21) Appl. No.: 14/648,697

(22) PCT Filed: Nov. 8, 2013

(86) PCT No.: PCT/JP2013/080177
§ 371 (c)(1),
(2) Date: May 30, 2015

(87) PCT Pub. No.: WO2014/091844
PCT Pub. Date: Jun. 19, 2014

(65) Prior Publication Data
US 2015/0298549 A1    Oct. 22, 2015

(30) Foreign Application Priority Data

Dec. 12, 2012  (JP) .................................. 2012-270881
Feb. 4, 2013   (JP) .................................. 2013-019347

(51) Int. Cl.
*B60Q 1/00*     (2006.01)
*B60K 37/00*    (2006.01)
*B60K 35/00*    (2006.01)

(52) U.S. Cl.
CPC ................. *B60K 37/00* (2013.01); *B60K 35/00* (2013.01)

(58) Field of Classification Search
CPC ....................................... B60Q 37/00
USPC ........ 340/461, 425.5, 435, 438; 701/1, 36, 93
See application file for complete search history.

(56) References Cited

U.S. PATENT DOCUMENTS

| 5,764,139 A | 6/1998 | Nojima et al. |
| 7,146,259 B2 * | 12/2006 | Arai .................. B60K 35/00 701/1 |
| 9,008,856 B2 * | 4/2015 | Ricci .................. G06F 9/54 455/404.1 |
| 2009/0015395 A1 | 1/2009 | Rahe et al. |

FOREIGN PATENT DOCUMENTS

| JP | 9-123848 A | 5/1997 |
| JP | 2003-244343 A | 8/2003 |

(Continued)

OTHER PUBLICATIONS

International Search Report issued in International Publication Application PCT/JP2013/080177 with Date of mailig Feb. 10, 2014, with English Abstract.

*Primary Examiner* — Tai T Nguyen
(74) *Attorney, Agent, or Firm* — McDermott Will & Emery LLP

(57) ABSTRACT

A vehicle information provision device comprises an on-board device having a device unit with a display unit that displays each type of vehicle status to a user, and a first control means that operates the display unit; and a communications unit that communicates between the device unit and the external device that outputs external information about the vehicle to the device unit. The communications unit is configured so as to be connectable to the device unit via an attachment/detachment means, and outputs to the device unit signals including at least either a video signal or an audio signal, as the external information for the vehicle, when the device unit is connected to the communications unit via the attachment/detachment means.

7 Claims, 8 Drawing Sheets

(56) References Cited

FOREIGN PATENT DOCUMENTS

| | | |
|---|---|---|
| JP | 2008-501574 A | 1/2008 |
| JP | 2009-281991 A | 12/2009 |
| JP | 2011-166290 A | 8/2011 |
| JP | 2011-193040 A | 9/2011 |
| JP | 2012-128620 A | 7/2012 |
| WO | 2011/049070 A1 | 4/2011 |

* cited by examiner (a)

(b)

VEHICLE INFORMATION PROVISION DEVICE

RELATED APPLICATIONS

This application is a national phase of International Application No. PCT/JP2013/080177, filed on Nov. 8, 2013, which in turn claims the benefit of Japanese Application No. 2012-270881, filed on Dec. 12, 2012 and Japanese Application No. 2013-019347, filed on Feb. 4, 2013 the disclosures of which Applications are incorporated by reference herein.

TECHNICAL FIELD

The present invention relates to a vehicle information provision device that provides various types of information to the user of a vehicle, and in particular, relates to a vehicle information provision device that provides various types of information by using an on-board device and an external device.

BACKGROUND ART

In the related art, for example, a system described in PTL 1 is known as an information display system as this type of vehicle information provision device. In the information display system described in PTL 1, an on-board device (device installed in a vehicle) such as an on-board navigation device and a portable terminal (external device) are connected in a wired manner or a wireless manner. If a connection state between the on-board device and the portable terminal is detected, a control device of the portable terminal supplies display data (external information for the vehicle) displayed on a screen of the portable terminal to the on-board device, and a control device of the on-board device displays the display data supplied from the portable terminal on the display of the on-board device.

This allows the user of the vehicle to view information that has been displayed on the screen of the external device such as the portable terminal, on the display (display unit) of the on-board device having a larger screen. When, for example, the on-board device such as a navigation system installed in the vehicle is applied as the display of the on-board device having a larger screen, it is possible to view the information displayed on the portable terminal, on the display of the on-board device having a larger screen provided in an optimal position inside the vehicle.

CITATION LIST

Patent Literature

PTL 1: JP-A-2003-244343

SUMMARY OF INVENTION

Technical Problem

In the information display system described in PTL 1 described above, since the display data that has been displayed on the screen of the portable terminal is displayed on the display of the on-board device having a larger screen, the user of the vehicle can easily view the display data displayed on the portable terminal. However, when the external information that the portable terminal (external device) has (external information for the vehicle) is presented to the user of the vehicle on the display of the on-board device, the configuration of the interface unit (communications unit) that transmits and receives the external information needs to be improved.

In particular, when the portable terminal is a multi-functional mobile phone such as a smart phone, the life cycle (functional evolution) of the product is significantly shorter as compared to that of the on-board device, and a change in the interface unit of the portable terminal (for example, a change from wired communication to wireless communication) within the life cycle of the on-board device is considered. The user of the vehicle needs to replace the on-board device in order to display the display data that has been displayed on the screen of the latest portable terminal on a large display of the on-board device having a larger screen.

However, it is not preferable to replace the on-board device with a new one, because the user of the vehicle feels the burden of cost. For example, when the vehicle is a motorcycle, since it has a limited amount of space for mounting a display which is a display unit on the structure of the vehicle, it is assumed to use a meter for a vehicle as the on-board device. Since the meter for a vehicle stores travel distance information for a vehicle, and the like, there is a problem in that if the meter for a vehicle is easily replaced, a correct travel distance cannot be presented to the user.

Thus, in order to handle the problems described above, an object of the present invention is to provide a vehicle information provision device capable of handling a change in the specification of an interface unit of an external device while avoiding increased cost, when external information that the external device has is provided to the user of a vehicle through a display provided in an on-board device.

Solution to Problem

According to an aspect of the present invention, there is provided a vehicle information provision device including an on-board device including a device unit including a display unit that displays various states of a vehicle as vehicle status information to the user and a first control means that operates the display unit; and a communications unit that communicates between the device unit and an external device that outputs external information for the vehicle to the device unit, in which the communications unit is configured to be connectable to the device unit through attachment/detachment means, and outputs a signal including at least either a video signal or an audio signal as the external information for the vehicle to the device unit, when the device unit is connected to the communications unit through the attachment/detachment means.

Further, in the present invention, the display unit has a first display region displaying a predetermined type of information out of the vehicle status information and a second display region displaying another type of information out of the vehicle status information, which is different from the predetermined type of information, when the first control means is connected to the communications unit through the attachment/detachment means, the first control means executes a first display mode for displaying the vehicle status information on the display unit and a second display mode for displaying the vehicle status information and the external information for the vehicle on the display unit, and in the second display mode, the first control means operates the display unit so as to display the external information for the vehicle in the second display region.

Further, in the present invention, if detecting operation information associated with an operation of the external device, which is output from a predetermined operation unit, by the user operating the operation unit, the first control means outputs the operation information to second control means provided in the external device through the communications unit, and the second control unit operates the external device based on the operation information.

In the present invention, the external device is constituted by at least two external devices having communication interfaces which are different from each other, since the communications unit is connected to one external device out of at least two external devices, the communications unit includes at least two types of interface units, at least two types of decoders provided so as to correspond to the at least two types of interface units, and a selection unit that selects an output from outputs of the at least two types of decoders, and a control unit provided in the communications unit controls the selection unit, depending on one connected external device.

In the present invention, a sound signal which is output from the communications unit is input to a sound-emitting body through a sound-emitting body drive circuit with an amplifier, and the sound-emitting body drive circuit is constituted by members other than the communications unit or the device unit.

Further, in the present invention, a control unit provided in the communications unit receives the vehicle status information through the device unit and the attachment/detachment means, and outputs the received vehicle status information to the second control unit provided in the external device.

Further, in the present invention, during the execution of the second display mode, the first control unit operates the display unit so as to display operation information associated with the operation of the external device in the second display region.

Further, in the present invention, the operation unit is configured to be able to perform at least either an operation of the device unit or an operation of the external device.

Advantageous Effects of Invention

According to the present invention, it is possible to provide a vehicle information provision device capable of handling a change in the specification of an interface unit of an external device while avoiding increased cost, when external information that the external device has is provided to the user of a vehicle through a display unit provided in an on-board device.

DESCRIPTION OF EMBODIMENTS

First Embodiment

Hereinafter, a description will be made regarding a first embodiment of the present invention with reference to FIG. 1 to FIG. 6.

Figure 1:
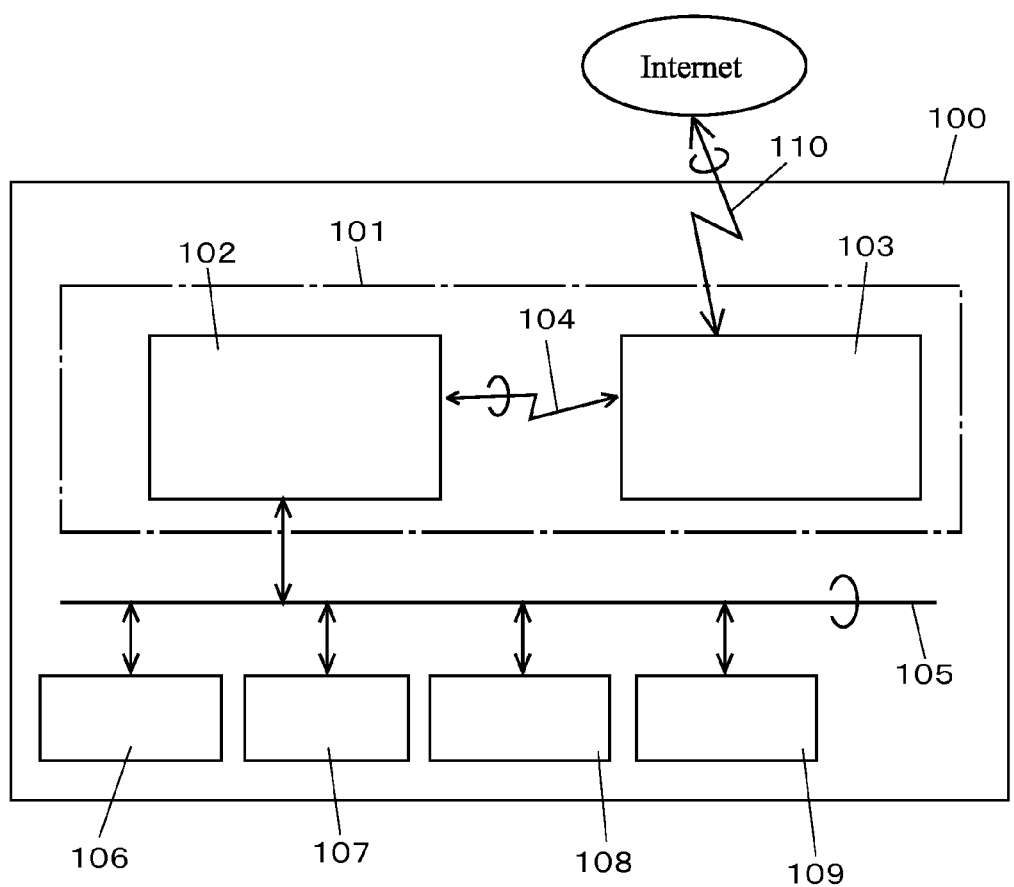
FIG. 1 is a block diagram illustrating a connection status between a vehicle information provision device according to a first embodiment of the present invention and various electrical components.

FIG. 1 is a block diagram illustrating an embodiment of the present invention, in FIG. 1, 100 indicates a vehicle. Further, 101 is a vehicle information provision device, the vehicle information provision device 101 includes an on-board device (here, a meter for a vehicle) 102, an external device which is a portable information terminal (here, a smart phone) 103, and connection means 104 that connects the on-board device 102 and the external device 103.

The on-board device 102 is connected to electrical equipment such as a stereo 106, an air conditioner 107, a body control unit 108, and an engine control unit 109, through an in-vehicle LAN (multiplex communication line) 105. Further, an external device 103 connected to the on-board device 102 through the connection means 104 is also connectable to the Internet through external communication means 110.

Figure 2:
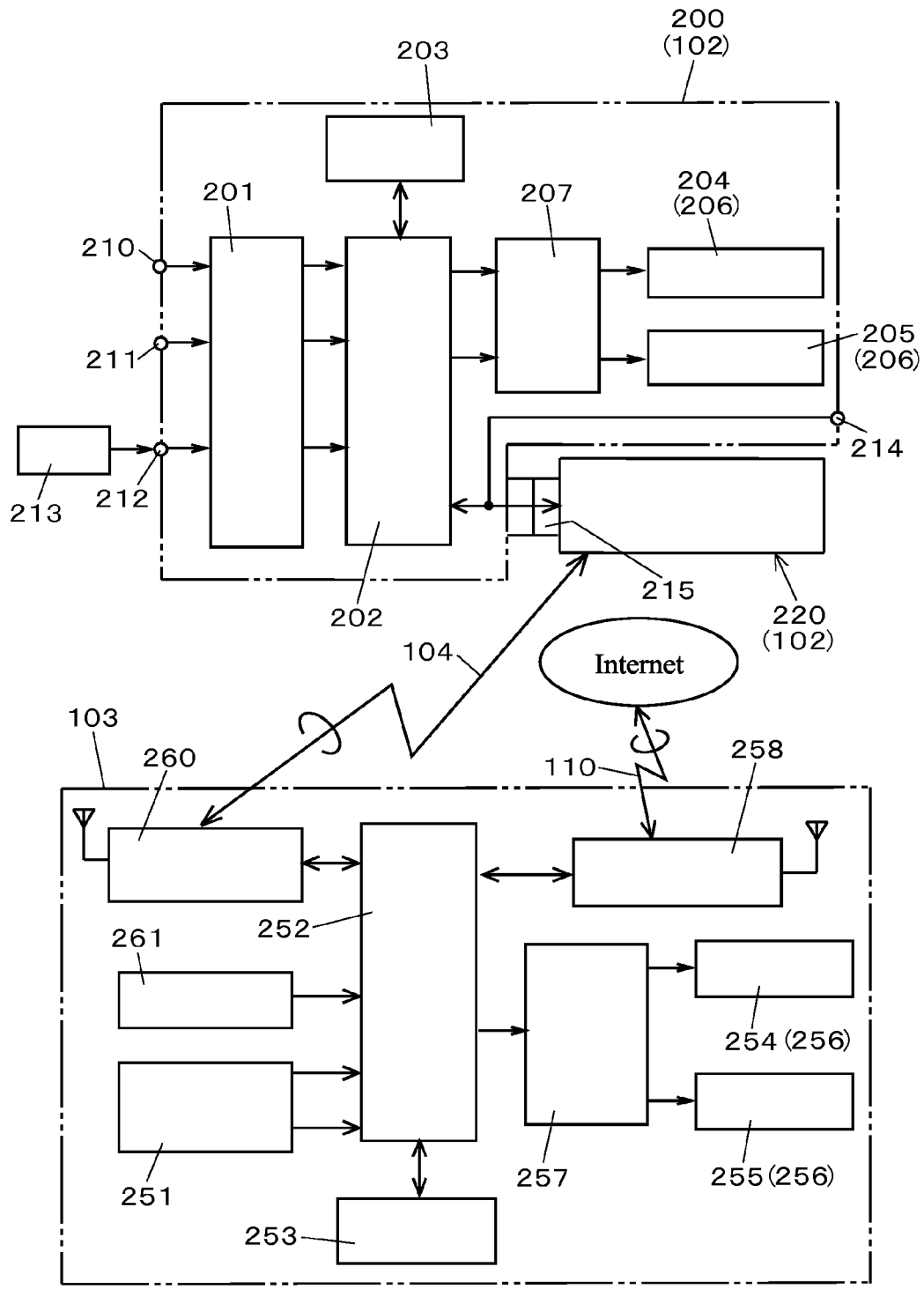
FIG. 2 is a block diagram illustrating the vehicle information provision device according to the embodiment.

Next, the configuration of the vehicle information provision device 101 which is mainly constituted by the on-board device 102 and the external device 103 will be described in detail, by using FIG. 2. The on-board device 102 includes a device unit 200 and a first communications unit 220 which is a communications unit, and the first communications unit 220 is configured to communicate between the device unit 200 and the external device 103.

The device unit 200 includes a vehicle information terminal (vehicle information means) 210 that inputs and outputs various types of information regarding various states of the vehicle (vehicle status signal), a multiplex communication I/O terminal (multiplex communication I/O means) 211, an operation information terminal 212 capable of inputting an operation signal from predetermined operation means 213, a sound output terminal 214, vehicle interface (vehicle I/F) means 201, first control means 202 which is constituted by for example, a microcomputer that controls the on-board device 102, first storage means 203 which is constituted by a non-volatile memory such as a flash memory or an EEPROM that stores a processing program of the first control means 202, first notification means 206 including first display unit (display unit) 204 such as a liquid crystal display panel or an organic EL panel that visually notifies the user of the vehicle of various types of information (various states of the vehicle) and a first sound-emitting body 205 such as a speaker which audibly notifies the user of the vehicle of various types of information (various states of the vehicle), and first drive means 207 that also performs drive control of the first display unit 204 and the first sound-emitting body 205.

Here, when the vehicle is a motorcycle, the first sound-emitting body 205 may be a helmet speaker housed in a helmet that the passenger (user) who gets on the motorcycle wears.

Further, the operation means 213 includes an operation input unit for performing various operations of the on-board device 102, for example, a substantially cross key type of operation input unit including cursor buttons, decision buttons, and the like provided in appropriate positions inside the vehicle where the hand of the user can reach is applicable. By the user operating the operation means 213, operation instruction signals destined for the external device 103 (remote operation instruction signal) which are output from the operation means 213 are input to the first control means 202 through the operation information terminal 212 and the vehicle interface means 201, and reach the external device 103 through the connection means 104. In addition, a touch panel type of operation input unit is applicable as the operation means 213, instead of the cross key type of operation input unit described above.

The first communications unit (communications unit) 220 constitutes connection means 104 for connecting to the external device 103, and here, Wi-Fi or Bluetooth (registered trademark) is used as the first communications unit 220.

Further, in this case, the first communications unit 220 is configured to be connectable to the device unit 200 constituting the main part of the on-board device 102 through the attachment/detachment means 215 including a connector or the like. In addition, the attachment/detachment means 215 may be configured, for example, by soldering and connecting the terminals rather than the connector such that the device unit 200 and the first communications unit 220 can be detachable.

Further, the external device 103 includes a second communications unit 260 which constitutes connection means 104 for connecting to the on-board device 102 (here, Wi-Fi or Bluetooth (registered trademark)), various types of sensors (here, a GPS module) 261, interface (I/F) means 251, second control means 252 which is constituted by for example, a microcomputer that controls the external device 103, second storage means 253 which is constituted by a non-volatile memory such as a flash memory or an EEPROM that stores a processing program of the second control means 252, second notification means 256 including second display unit 254 such as a display with a touch panel that visually notifies the user of the vehicle of various types of information (various states of the vehicle) and second sound-emitting body 255 such as a speaker which audibly notifies the user of the vehicle of various types of information (various states of the vehicle), second drive means 257 that also performs drive control of the second display unit 254 and the second sound-emitting body 255, and a communications module 258 constituting external communication means 110 for connecting to the Internet.

Here, the second communications unit 260 performs wireless communication with the first communications unit 220 included in the on-board device 102. In other words, the second communications unit 260 enables data exchange with the first communications unit 220 included in the on-board device 102.

Further, in the present embodiment, the first and second communications units 220 and 260 which are wireless communication means are applied to the connection means 104 of the on-board device 102 and the external device 103, but without being limited thereto, it is possible to connect the on-board device 102 and the external device 103 by using connection means 104 which is wired communication means including a cable such as a USB cable or an HDMI (registered trademark) cable. In addition, in a case of switching from the wireless communication means (wireless connection) to the wired communication means (wired connection), it is possible to realize the wired connection between the on-board device 102 and the external device 103 by replacing the first communications unit 220 with one corresponding to the wired communication means.

Figure 3:
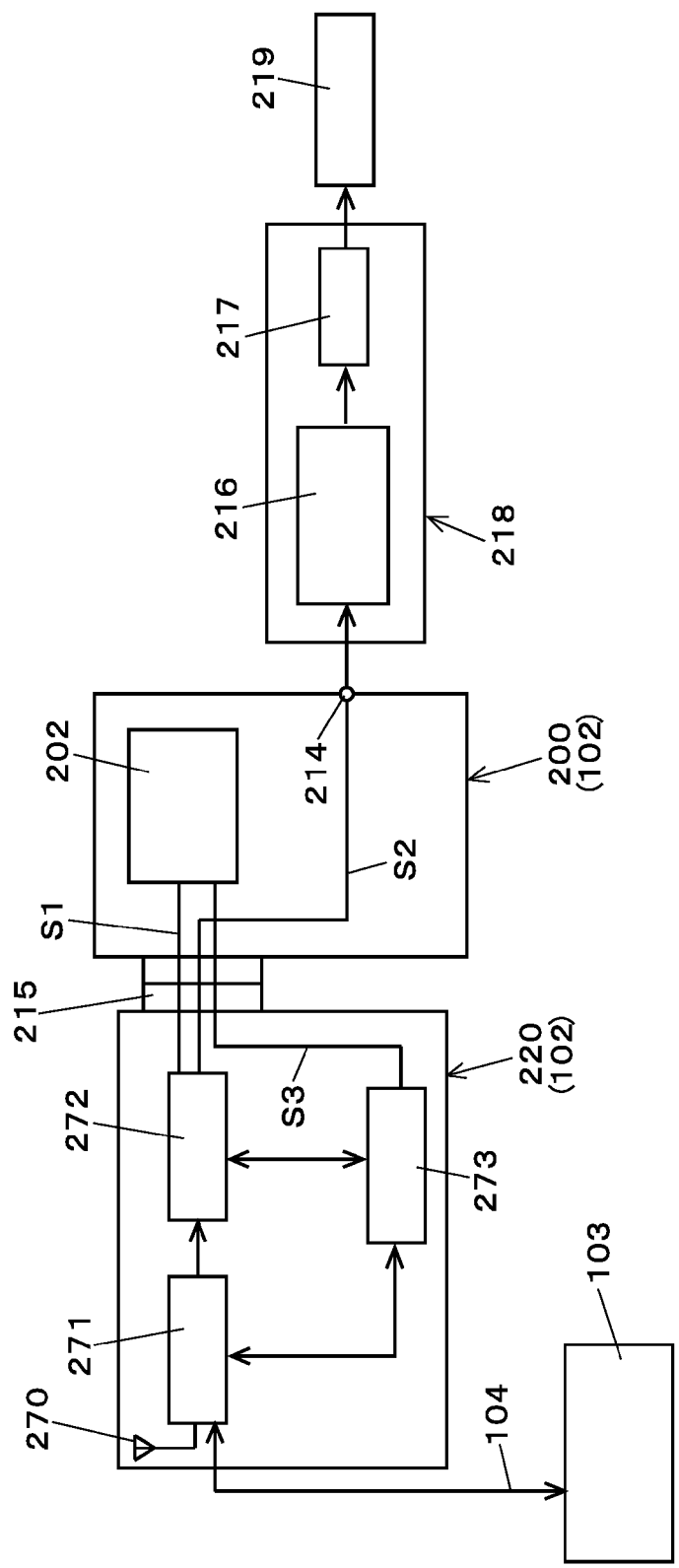
FIG. 3 is a block diagram of the vehicle information provision device when an on-board device according to the embodiment and an external device are connected in a wireless manner.

FIG. 3 illustrates a block diagram of the vehicle information provision device 101 when the on-board device and the external device are connected in a wireless manner, and the first communications unit 220 corresponding to the wireless connection is mainly constituted by an antenna 270, a wireless I/F 271, a decoder (wireless decoder) 272, and a control unit 273. The control unit 273 performs control of the antenna 270, the wireless I/F 271, and the decoder 272.

Then, when the device unit 200 and the first communications unit 220 are connected through the attachment/detachment means 215, the data exchange between the device unit 200 of the on-board device 102 and the external device 103 is performed through the connection means 104, the antenna 270, the wireless I/F 271, and the decoder 272.

Further, when the device unit 200 and the first communications unit 220 are connected through the attachment/detachment means 215, the data exchanged between the device unit 200 and the first communications unit 220 through the attachment/detachment means 215 contains a GND signal (ground signal), a power source, and the like, which are not shown in the drawing, in addition to the video signal S1, the sound signal S2, and the control signal S3. In particular, in this case, the first communications unit 220 can output at least one signal out of the video signal S1 and the sound signal S2 which are transmitted from the external device 103 as the external information for the vehicle, to the device unit 200.

Further, among exchanged data pieces, the video signal S1 is output from the decoder 272 and input (supplied) to the first control means 202, the control signal S3 is output from the control unit 273 and input (supplied) to the first control means 202, and the sound signal S2 is output from the decoder 272 and input (supplied) to the sound output terminal 214.

In addition, the sound signal S2 which is output from the sound output terminal 214 (communications unit 220) is input to the speaker 219 as the third sound-emitting body, through the driver 218 as a drive unit (sound-emitting body drive circuit) including the D/A converter 216 and the amplifier 217. Here, the driver 218 is constituted by members other than the communications unit 220 or the device unit 200.

In this manner, since the driver 218 is constituted by members other than the communications unit 220 or the device unit 200, when the vehicle is, for example, a motorcycle, a case is considered in which a helmet speaker housed in a helmet that the passenger (user) who gets on the motorcycle wears is used and the driver 218 is not mounted, but it is possible to easily handle this case. It is possible to apply, for example, a speaker for a navigation device or a stereo device which is mounted in the vehicle as the speaker 219. In addition, the speaker 219 corresponds to the sound-emitting body in claim 5 in the claims.

Further, the control unit 273 provided in the first communications unit 220 is configured to receive vehicle status information which is the vehicle status signal (here, a vehicle speed signal indicating the traveling speed of the vehicle) through the device unit 200 and the attachment/detachment means 215, and output the received vehicle status information to the second control means 252 included in the external device 103 through the connection means 104. Then, the second control means 252 calculates the travel distance of the vehicle based on the vehicle speed signal and controls the second display unit 254 so as to perform a display operation of displaying predetermined maintenance information (for example, oil change time information) corresponding to the travel distance of the vehicle on the second display unit 254, and thus it is possible to attract attention from the user. According to such a configuration, there is no need for the first communications unit 220 to have a direct interface with a vehicle, the components of a protection circuit and the like are not required, and thus it is possible to suppress the cost increase as much as possible.

Figure 4:
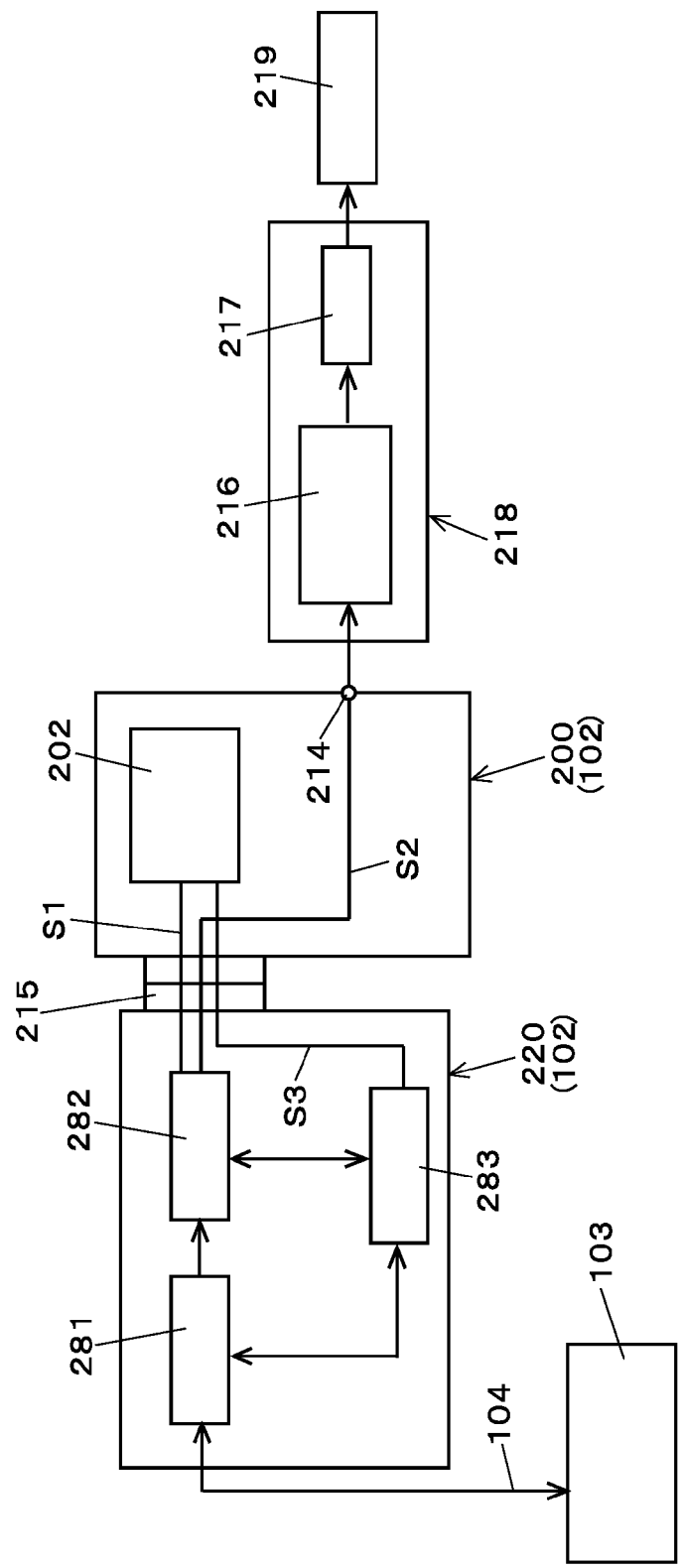
FIG. 4 is a block diagram of the vehicle information provision device when the on-board device according to the embodiment and the external device are connected in a wired manner.

Meanwhile, FIG. 4 illustrates a block diagram of the vehicle information provision device 101 when the on-board device and the external device are connected in a wired manner by the cable or the like, instead of the wireless connection, and the first communications unit 220 corresponding to the wired connection is mainly constituted by a wired I/F 281, a decoder (wired decoder) 282, and a control unit 283. The control unit 283 performs control of the wired I/F 281 and the decoder 282.

Then, when the device unit 200 and the first communications unit 220 are connected through the attachment/detachment means 215, the data exchange between the device unit 200 of the on-board device 102 and the external device 103 is performed through the connection means 104, the wired I/F 281, and the decoder 282.

Further, when the device unit 200 and the first communications unit 220 are connected through the attachment/detachment means 215, the data exchanged between the device unit 200 and the first communications unit 220 through the attachment/detachment means 215 contains a GND signal (ground signal), a power source, and the like, which are not shown in the drawing, in addition to the video signal S1, the sound signal S2, and the control signal S3. In particular, in this case, the first communications unit 220 can output at least one signal out of the video signal S1 and the sound signal S2 which are transmitted from the external device 103 as the external information for the vehicle, to the device unit 200.

Further, among exchanged data pieces, the video signal S1 is output from the decoder 282 and input (supplied) to the first control means 202, the control signal S3 is output from the control unit 283 and input (supplied) to the first control means 202, and the sound signal S2 is output from the decoder 282 and input (supplied) to the sound output terminal 214. In addition, the sound signal S2 that is output from the sound output terminal 214 is input to the speaker 219, through the driver 218 as a drive unit including the D/A converter 216 and the amplifier 217.

Next, a display layout displayed on the first display unit 204 when the first control means 202 included in the on-board device 102 executes first and second display modes described later will be described by using FIG. 5 to FIG. 7.

Figure 5:
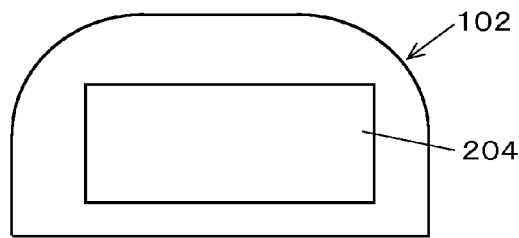
FIG. 5 is a schematic view illustrating an example of the on-board device according to the embodiment.

Here, the device unit 200 included in the on-board device 102, as illustrated in FIG. 5, includes first display unit 204 constituted by the liquid crystal display panel, and the first display unit 204 is constituted by a display for a meter that displays various states of a vehicle as vehicle status information to the user of a vehicle.

Figure 6:
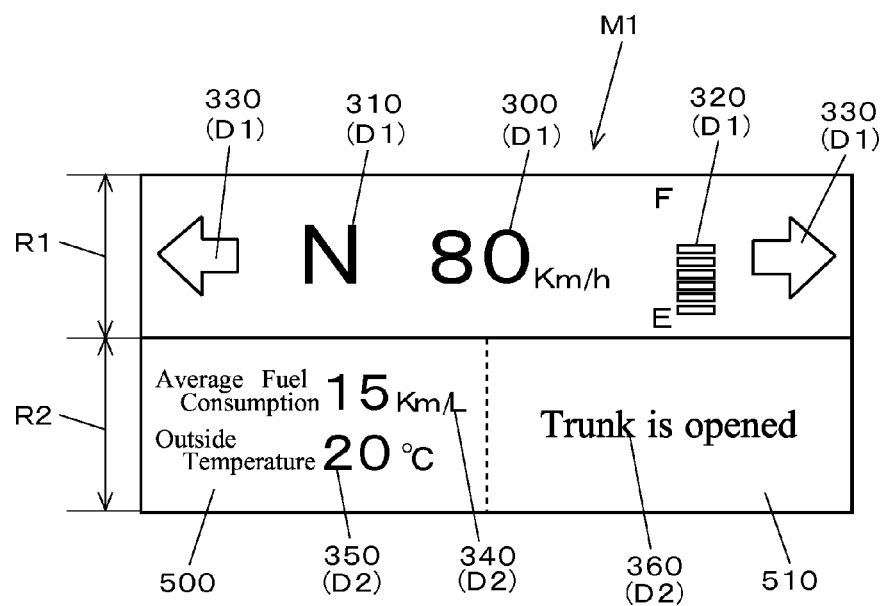
FIG. 6 is a diagram illustrating a display layout of a first display unit in a first display mode according to the embodiment.
Figure 7:
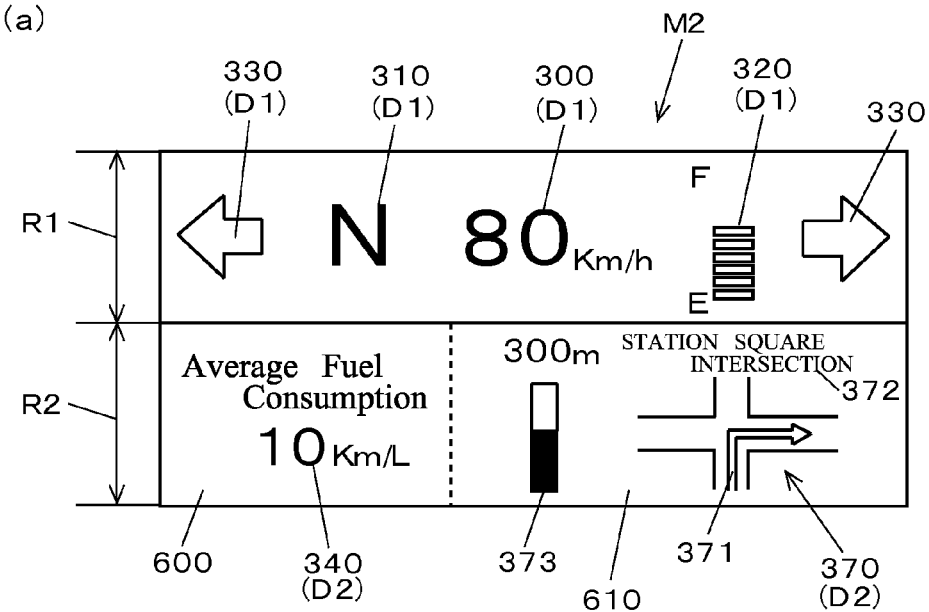
FIG. 7(a) is a diagram illustrating a display layout of the first display unit in a second display mode according to the embodiment.
FIG. 7(b) is a diagram illustrating a display layout of the first display unit when first control means receives a warning signal in the second display mode according to the embodiment.
Figure 7:
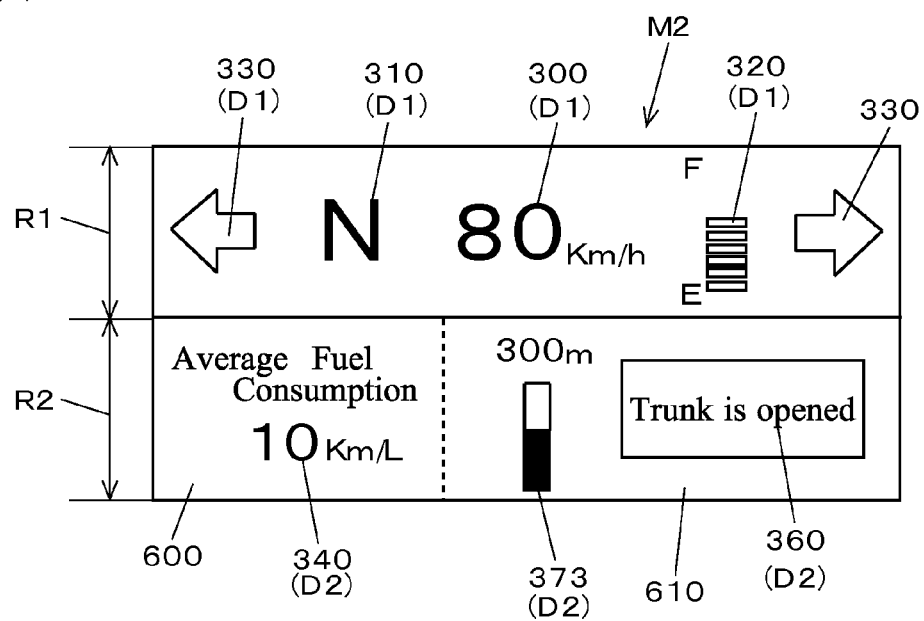

When the first control means 202 is connected to the first communications unit 220 through the attachment/detachment means 215, the first control means 202 receives the vehicle status signal through the multiplex communication I/O terminal 211 (or vehicle information terminal 210), and controls the first display unit 204 so as to perform a display operation of displaying vehicle status information corresponding to the first display mode M1 as illustrated in FIG. 6 on the first display unit 204, based on the vehicle status signal.

In the first display mode M1 where all pieces of external information for the vehicle described later are not displayed and only vehicle status information is displayed on the first display unit 204, the first control means 202 controls the first display unit 204 so as to perform a display operation of displaying a vehicle speed display portion 300 displaying a traveling speed of a vehicle as the vehicle status information, a shift position display portion 310 displaying a shift position, a fuel remaining amount display portion 320 displaying a remaining amount of fuel, a direction indication display portion 330 displaying the traveling direction of a vehicle, a fuel consumption display portion 340 displaying an average fuel consumption of a vehicle, an outside temperature display portion 350 displaying the temperature outside a vehicle, and a warning display portion 360 on the first display unit 204.

Further, in the first display mode M1, the first display unit 204 has a first display region R1 and a second display region R2 which are separated from each other. The first display region R1 is located on the upper side of the first display unit 204, and displays the vehicle speed display portion 300, the shift position display portion 310, the fuel remaining amount display portion 320, and the direction indication display portion 330, described above, which are predetermined types of information D1, among vehicle status information pieces.

The vehicle speed display portion 300 is displayed in the center of the first display region R1, the shift position display portion 310 is located on the left side of the vehicle speed display portion 300 so as to be adjacent to the vehicle speed display portion 300, the fuel remaining amount display portion 320 is located on the right side of the vehicle speed display portion 300 so as to be adjacent to the vehicle speed display portion 300, the direction indication display portion 330 is located on both ends of the first display region R1 so as to sandwich the shift position display portion 310 and the fuel remaining amount display portion 320 therebetween.

Further, here, the predetermined types of information D1 including the vehicle speed display portion 300, the shift position display portion 310, the fuel remaining amount display portion 320, and the direction indication display portion 330 are vehicle status information pieces which have high priorities and are viewed by the user of the vehicle at a high frequency, and has a display layout displaying the predetermined types of information D1 in the first display region R1 in the first display mode M1.

Meanwhile, the second display region R2 is located on the lower side of the first display unit 204, and displays the fuel consumption display portion 340, the outside temperature display portion 350, and the warning display portion 360, described above, which are other types of information D2 of the vehicle status information which are different from the predetermined types of information D1.

The fuel consumption display portion 340 and the outside temperature display portion 350 are displayed in a state of being arranged vertically on the left side of the second display region R2, and the outside temperature display portion 350 is displayed directly below the fuel consumption display portion 340. In addition, by the user operating the operation means 213, it is possible to switch both the fuel consumption display portion 340 and the outside temperature display portion 350 displayed in the second display region R2 to a different display (for example, a travel distance display and an engine speed display). In other words, this means that the operation means 213 is configured to be able to perform at least one operation out of the operation of the external device 103 described later and the operation (operation relating to a vehicle meter function of the device unit 200) of the device unit 200 included in the on-board device 102.

Further, if the first control means 202 receives various types of warning signals (here, a trunk-open signal indicating that the trunk in the rear part of the vehicle is open) through the multiplex communication I/O terminal 211 (or the vehicle information terminal 210), the first control means 202 causes the first display unit 204 to perform a display operation based on the warning signal such that a warning display portion 360 "trunk is open" on the right side of the second display region R2 of the first display unit 204. Thus, in the present embodiment, one piece of vehicle status information contains the warning display portion 360 as warning attention information for attracting attention from the user of the vehicle.

Further, here, other types of information D2 including the fuel consumption display portion 340, the outside temperature display portion 350, and the warning display portion 360 are vehicle status information pieces which are viewed by the user of the vehicle at a low frequency, and has a display layout displaying other types of information D2 in the second display region R2 in the first display mode M1. In addition, in the second display region R2 during the execution of the first display mode M1, the display area of a left region 500 in which the fuel consumption display portion 340 and the outside temperature display portion 350 are displayed is substantially equal to the display area of a right region 510 in which the warning display portion 360 is displayed.

Next, when the first control means 202 performs the second display mode M2 different from the first display mode M1, the display layout displayed on the first display unit 204 will be described.

During the execution of the second display mode M2, the first control means 202 receives the vehicle status signal through the multiplex communication I/O terminal 211 (or the vehicle information terminal 210); and when it is connected to the first communications unit 220 through the attachment/detachment means 215, the first control means 202 receives the external information for the vehicle (here, navigation information) through respective communications units 260 and 220 from the external device 103, as illustrated in FIG. 7(a), and controls the first display unit 204 so as to perform the display operation of displaying the display information corresponding to the second display mode M2, based on the vehicle status signal and the navigation information on the first display unit 204.

In other words, in the second display mode M2, the second control means 252 (external device 103) outputs navigation information to the first control means 202 (device unit 200) through respective communications units 260 and 220 (connection means 104), and the first control means 202 controls the first display unit 204 so as to perform the display operation of displaying the navigation display portion 370 (external information for the vehicle) in the second display region R2.

Accordingly, the display information corresponding to the second display mode M2 contains a vehicle speed display portion 300, a shift position display portion 310, a fuel remaining amount display portion 320, a direction indication display portion 330, a fuel consumption display portion 340, and a navigation display portion 370. In addition, the external information for the vehicle may be mail incoming information, call incoming information, music information, and the like, in addition to the navigation display portion 370.

Then, the predetermined types of information D1 including the vehicle speed display portion 300, the shift position display portion 310, the fuel remaining amount display portion 320, and the direction indication display portion 330 among these pieces of information are displayed in the first display region R1 similar to the case of the first display mode M1, and respective display positions of the vehicle speed display portion 300, the shift position display portion 310, the fuel remaining amount display portion 320, and the direction indication display portion 330 in the second display mode M2 are the equal to the positions in the case of the first display mode M1.

In this manner, in the case of the present embodiment, the first display region R1 is configured as a fixed display region where the predetermined types of information D1 including the vehicle speed display portion 300, the shift position display portion 310, the fuel remaining amount display portion 320, and the direction indication display portion 330 are able to be displayed in predetermined display positions, during the execution of both display modes M1 and M2.

Then, in the second display mode M2, the fuel consumption display portion 340 and the navigation display portion 370 which are information other than the predetermined types of information D1 including the vehicle speed display portion 300, the shift position display portion 310, the fuel remaining amount display portion 320, and the direction indication display portion 330 are displayed in the second display region R2.

In other words, the second display mode M2 is a display mode in which the vehicle status information including the vehicle speed display portion 300, the shift position display portion 310, the fuel remaining amount display portion 320, the direction indication display portion 330, and the fuel consumption display portion 340, and the external information for the vehicle including the navigation display portion 370 are displayed on the first display unit 204.

In the second display mode M2, the outside temperature display portion 350 and the warning display portion 360 which have been displayed in the second display region R2 at the time of the first display mode M1 become a non-display state, and with respect to the fuel consumption display portion 340, the digital display value and the unit display of the fuel consumption comes directly below the display "average fuel consumption" and the left region 500 described above is in a reduced state. Hereinafter, the reduced left region 500 will be described as a left area 600 in the second display region R2 in the second display mode M2.

Then, a navigation display portion 370 formed of a turn-by-turn display is displayed in a right area 610 which is an area except for the left area 600 and located on the right side of the left area 600, in the second display region R2. As illustrated in FIG. 7(a), the turn-by-turn display includes an arrow indication 371, an intersection name indication 372, and a remaining distance to the intersection display 373. In addition, a map display can be applied to the navigation display portion 370 instead of the turn-by-turn display.

In other words, with respect to the right region 510 described above which has been formed in the second display region R2 during the execution of the first display mode M1, the right region 510 is formed as an expanded right area 610 during the execution of the second display mode M2, and the navigation display portion 370 is displayed in the right area 610.

In this manner, in the case of the present embodiment, whereas the navigation display portion 370 which is the external information for the vehicle is displayed in the second display region R2 during the execution of the second display mode M2, the display form of other types of information D2 (for example, the fuel consumption display portion 340 and the navigation display portion 370) is configured as a variable display region that can be changed.

Next, during the execution of the second display mode M2 illustrated in FIG. 7(a), the display layout of the first display unit 204 when the first control means 202 receives the warning signal will be described based on FIG. 7(b).

FIG. 7(b) displays a modification of the second display mode M2 in which the warning display portion 360 described above is displayed so as to interrupt a part (at least a part) of the navigation display portion 370. In this case, the first control means 202 has a function of determining the occurrence of the warning signal, during the execution of the second display mode M2, and when it is determined that the warning signal occurs, the first control means 202 controls the first display unit 204 so as to perform the display operation of switching a part of the navigation display portion 370 displayed on the right side of the second display region R2 to the warning display portion 360.

Then, for example, as illustrated in FIG. 7(b), in the first display unit 204, the arrow indication 371 and the intersection name indication 372 which have been displayed in the second display region R2 until then become a non-display state, and the warning display portion 360 "trunk is open" is displayed to interrupt the position in which the arrow indication 371 and the intersection name indication 372 had been displayed until then. Thereafter, if the first control means 202 receives a trunk-close signal indicating the trunk is closed, the first control means 202 controls the first display unit 204 to perform the display operation of returning the first display unit 204 to the display layout of FIG. 7(a), based on the trunk-close signal (in other words, the warning display portion 360 becomes a non-display state, and the arrow indication 371 and the intersection name indication 372 are displayed again).

In this manner, in the present embodiment, provided is the on-board device 102 including the device unit 200 including the first display unit 204 that displays the various states of a vehicle as vehicle status information to the user and the first control means 202 that operates the first display unit 204, and a first communications unit 220 that communicates between the device unit 200 and the external device 103 that outputs the external information for the vehicle to the device unit 200, the first communications unit 220 is configured to be connectable to the device unit 200 through the attachment/detachment means 215, and when the device unit 200 is connected to the first communications unit 220 through the attachment/detachment means 215, a signal including at least one out of the video signal S1 and the sound signal S2 is output to the device unit 200 as the external information for the vehicle.

Accordingly, when the specification of the second communications unit 260 included in the external device 103 changes, for example, from the communications unit for wired connection (for wired communication) to the communications unit for wireless connection (for wireless communication), the replacement of the device unit 200 included in the on-board device 102 is not needed at all, it is possible to realize connection (cooperation) between the on-board device 102 and the external device 103 and avoid the increased cost by simply replacing the first communications unit 220 included in the on-board device 102 from the communications unit for wired connection illustrated in FIG. 4 to the communications unit for wireless connection illustrated in FIG. 3, and when the external information that the external device 103 has is provided to the user through the first display unit 204 included in the on-board device 102, it is possible to provide a vehicle information provision device capable of responding to the change in the specification of the interface unit (communications unit) of the external device 103.

Further, in the present embodiment, the first display unit 204 includes a first display region R1 displaying predetermined types of information D1 among vehicle status information pieces and a second display region R2 displaying other types of information D2 of the vehicle status information which are different from the predetermined types of information D1, and when the first control means 202 is connected to the first communications unit 220 through the attachment/detachment means 215, the first control means 202 executes the first display mode M1 displaying the vehicle status information on the first display unit 204 and the second display mode M2 displaying the vehicle status information and the navigation display portion (external information for the vehicle) 370 on the first display unit 204, and operates the first display unit 204 so as to display the navigation display portion 370 on the second display region R2 in the second display mode M2.

Accordingly, when the external information for the vehicle that the external device 103 has is provided to the user of the vehicle through the first display unit 204 included in the on-board device 102, with respect to the predetermined types of information D1 including the vehicle speed display portion 300, the shift position display portion 310, the fuel remaining amount display portion 320, and the direction indication display portion 330 which are displayed in the first display region R1 of the first display unit 204, the display positions (display layout) are unchanged regardless of switching the display modes M1 and M2, such that the movement amount of the information displayed on the first display unit 204 is suppressed to a required minimum value, and it is possible to provide a vehicle information provision device with an improved human-machine interface.

Second Embodiment

Figure 8:
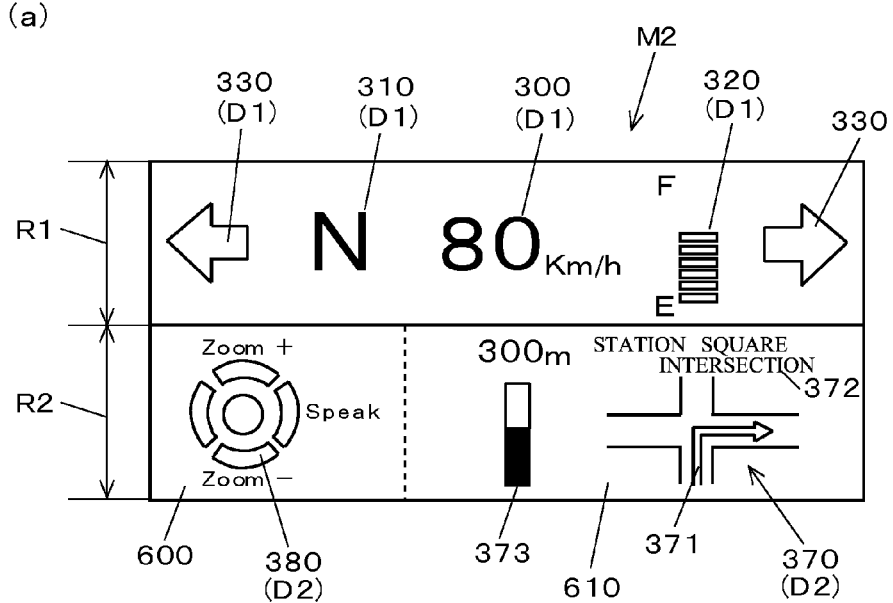
FIG. 8(a) is a diagram illustrating a display layout of a first display unit in a second display mode according to a second embodiment of the present invention.
FIG. 8(b) is a diagram illustrating a display layout of the first display unit when the first control means receives the warning signal in the second display mode according to the second embodiment.
Figure 8:
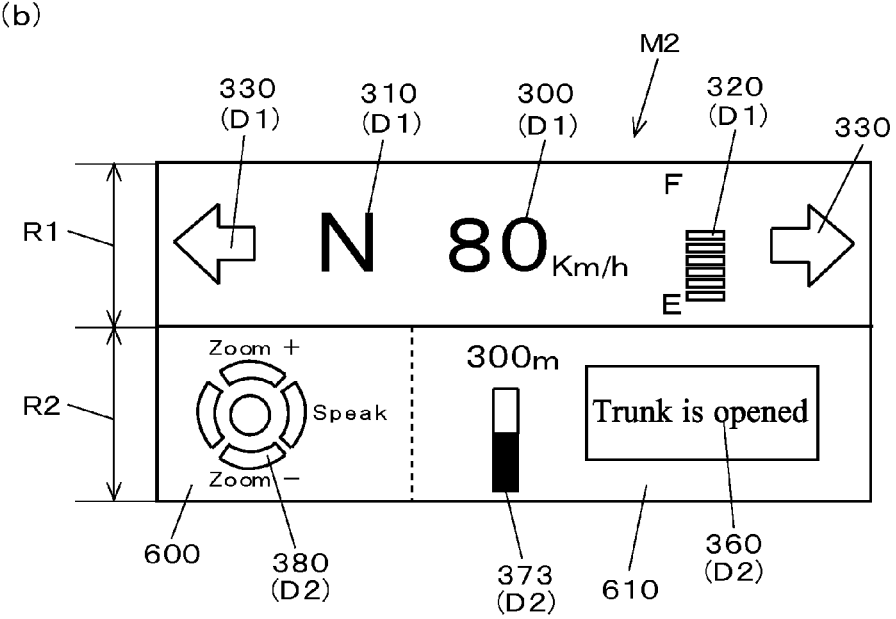

Next, a second embodiment of the present invention will be described based on FIG. 8, but the same or corresponding components as in the first embodiment described above are denoted by the same reference numerals, and thus a specific description thereof will be omitted. The second embodiment is different from the first embodiment in that as illustrated in FIG. 8(a), in the second display mode M2, the fuel consumption display portion 340 which has been displayed on the left side of the second display region R2 becomes a non-display state, and an operation display portion 380 is displayed instead of the fuel consumption display portion 340.

In the second embodiment, during the execution of the second display mode M2, the first control means 202 controls a display operation of the first display unit 204 so as to display external information for the vehicle including the operation display portion 380 which is the operation information associated with the operation of the external device 103 and a navigation display portion 370 in the second display region R2.

In addition, in the second embodiment, similar to the case in the first embodiment, a predetermined type of information D1 displayed in the first display region R1 includes the vehicle speed display portion 300, the shift position display portion 310, the fuel remaining amount display portion 320, and the direction indication display portion 330.

The operation display portion 380 displays the operation information of the external device 103 in response to the navigation display portion 370 displayed to be adjacent on the right side. Further, the outer shape of the operation means 213 and operable operation functions are displayed in the operation display portion 380. Here, "Zoom +" corresponding to the expansion of a map display, "Zoom –" corresponding to the reduction of the map display, and "Speak" corresponding to the implementation of voice guidance of a route are displayed as the operation functions.

The user operates the operation means 213 while watching the operation information displayed on the operation display portion 380 (here, it is assumed that the "Zoom +" described above is operated). The operation signal destined for the external device 103 which is output from the operation means 213 in response to the operation of the operation means 213 is input to the first control means 202 through the operation information terminal 212 and the vehicle interface means 201, and is input to the second control means 252 of the external device 103 through the control unit 273 (or control unit 283) included in the first communications unit 220 and the connection means 104.

In other words, in this case, if the first control means 202 detects the operation signal (the operation information) associated with the operation of the external device 103 that is output from the operation means 213, by the user operating the operation means 213, the operation signal is output to the second control means 252 included in the external device 103 through the first communications unit 220.

The second control means 252 operates the external device 103 based on the operation signal, inputs the expanded map data to the second communications unit 260, and outputs the expanded map data to the first control means 202 included in the device unit 200 through the connection means 104 and the first communications unit 220, as a video signal. The first control means 202 operates the first display unit 204 so as to display the expanded map data (video signal) on the navigation display portion 370.

Also in such a second embodiment, when the specification of the second communications unit 260 included in the external device 103 changes, for example, from the communications unit for wired connection (for wired communication) to the communications unit for wireless connection (for wireless communication), the replacement of the device unit 200 included in the on-board device 102 is not needed at all, and it is possible to achieve the same effects as in the first embodiment by simply replacing the first communications unit 220 included in the on-board device 102 from the communications unit for wired connection illustrated in FIG. 4 to the communications unit for wireless connection illustrated in FIG. 3.

Further, in the second embodiment, since the navigation display portion 370 and the operation display portion 380 are displayed in the second display region R2, in the second display mode M2, there is an advantage that the position of the buttons (operation position) and the operation contents of the operation means 213 which is a substantially cross key type of operation input unit can be presented in order for the user of the vehicle to easily understand.

Further, in the second display mode M2 illustrated in FIG. 8(a), when the warning information is received, as illustrated in FIG. 8(b), the first control means 202 causes the first display means 204 to perform a display operation such that at least apart of the navigation display portion 370 (for example, arrow indication 371 and intersection name indication 372) is changed to the warning display portion 360 (other type of information D2) in which "trunk is open" is indicated. With respect to this, the same process as the display switching from the display layout illustrated in FIG. 7(a) in the first embodiment to the display layout illustrated in FIG. 7(b) is performed.

Third Embodiment

Next, a third embodiment of the present invention will be described based on FIG. 9, but the same or corresponding components as in the first and second embodiments described above are denoted by the same reference numerals, and thus a specific description thereof will be omitted. The third embodiment is different from the first embodiment in that the external device 103 is constituted by at least two external devices (here, the number of external devices is two, and they are a first external device 103a and a second external device 103b) having communication interfaces which are different from each other, and the first communications unit 220 is configured to correspond to the two external devices.

In this case, the first external device 103a out of the two external devices has a communication interface for wireless connection and is connectable to the on-board device 102 through the connection means 104, and the second external device 103b out of the two external devices has a communication interface for wired connection and is connectable to the on-board device 102 through the connection means 104. In addition, the configurations of the first and second external devices 103a and 103b are basically the same as the configuration of the external device 103 employed in the first embodiment, and only the configuration of the second communications unit 260 (the communication interface) is different.

Figure 9:
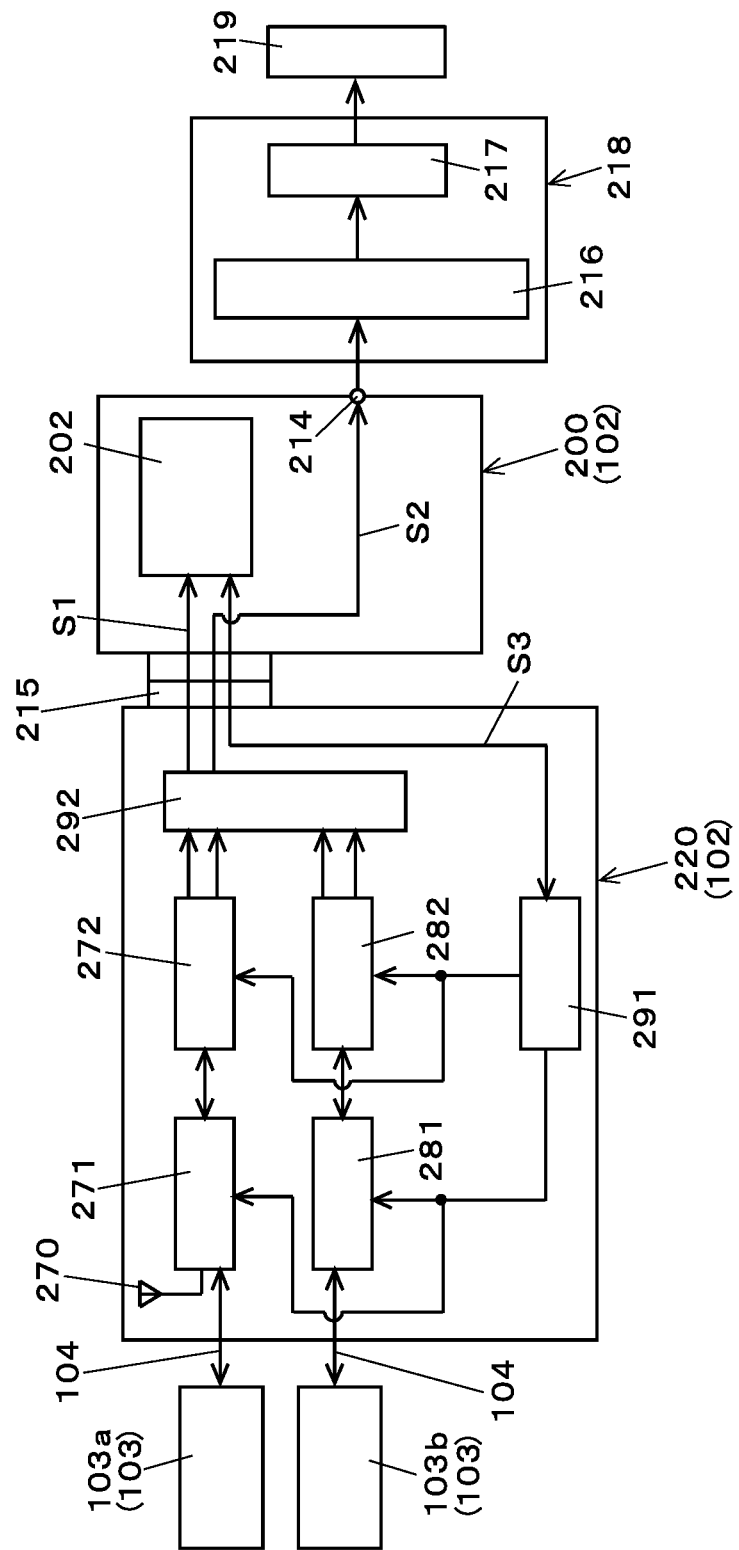
FIG. 9 is a block diagram of a vehicle information provision device according to a third embodiment of the present invention.

As illustrated in FIG. 9, since the first communications unit 220 in the third embodiment is connected to one external device (a first external device 103a or a second external device 103b) out of two external devices, the first communications unit 220 includes an antenna 270, at least two types of interface units (here, there are two types of interface units, a wireless I/F 271 and a wired I/F 281), at least two types of decoders (here, there are two types of decoders, a wireless decoder 272 and a wired decoder 282), a control unit 291 that performs control of the antenna 270, the wireless I/F 271, the wireless decoder 272, the wired I/F 281, and the wired decoder 282, and a selection unit 292 that selects one of the outputs from the wireless decoder 272 and the wired decoder 282.

Here, the two types of decoders are provided so as to correspond to the two types of interface units. In other words, if attention is paid to the first communications unit 220 and the two external devices, the wireless I/F 271 is provided so as to correspond to the first external device 103a and the wireless decoder 272, and the wired I/F 281 is provided so as to correspond to the second external device 103b and the wired decoder 282.

Further, the control unit 291 provided in the first communications unit 220 in the third embodiment controls the selection unit 292 depending on one connected external device (in other words, whether the connected external device is the first external device 103a or the second external device 103b) such that it is possible to correspond to the first external device 103a or the second external device 103b having different communication interfaces.

Then, when the device unit 200 and the first communications unit 220 are connected through the attachment/detachment means 215, the data exchange between the device unit 200 of the on-board device 102 and the two external devices (first and second external devices 103a and 103b) is performed through the connection means 104, the antenna 270, the wireless I/F 271, the wireless decoder 272, and the selection unit 292, in the case of wireless connection; and the data exchange is performed through the connection means 104, the wired I/F 281, the wired decoder 282, and the selection unit 292, in the case of wired connection.

Here, when the device unit 200 and the first communications unit 220 are connected through the attachment/detachment means 215, the data exchanged between the device unit 200 and the first communications unit 220 through the attachment/detachment means 215 contains a GND signal, a power source, and the like, in addition to the video signal S1, the sound signal S2, and the control signal S3. In particular, in this case, the first communications unit 220 can output at least one signal out of the video signal S1 and the sound signal S2 which are transmitted from the external device 103 as the external information for the vehicle, to the device unit 200.

Further, among exchanged data pieces, the video signal S1 is output from the selection unit 292 and input (supplied) to the first control means 202, the control signal S3 is output from the control unit 291 and input (supplied) to the first control means 202, and the sound signal S2 is output from the selection unit 292 and input (supplied) to the sound output terminal 214.

In addition, the sound signal S2 which is output from the sound output terminal 214 (communications unit 220) is output to the speaker 219 through the driver 218 including the D/A converter 216 and the amplifier 217. Further, also in this case, the driver 218 is constituted by members other than the communications unit 220 or the device unit 200.

The control unit 291 provided in the first communications unit 220 receives a vehicle status signal (for example, a vehicle speed signal indicating the traveling speed of the vehicle) through the device unit 200 and the attachment/detachment means 215, and outputs the received vehicle status signal to the second control means 252 through the connection means 104. Then, the second control means 252 controls the second display unit 254 so as to perform a display operation of calculating the travel distance of the vehicle based on the vehicle speed signal and displaying the maintenance information corresponding to the travel distance of the vehicle on the second display unit 254, and thus it is possible to attract attention from the user.

According to such a third embodiment, since the first communications unit 220 is connected to one external device out of the two external devices, the first communications unit 220 includes the wireless I/F 271 and the wired I/F 281, the wireless decoder 272 and the wired decoder 282 so as to correspond to the wireless I/F 271 and the wired I/F 281, and the selection unit 292 that selects one of the outputs from the wireless decoder 272 and the wired decoder 282, the control unit 291 provided in the first communications unit 220 controls the selection unit 292 depending on one connected external device, the first communications unit 220 is connectable to the either the first external device 103a or the second external device 103b having different communication interfaces, and therefore, it becomes possible to increase the versatility of the first communications unit 220.

In addition, in the respective embodiments, descriptions have been made regarding cases in which the first display unit 204 is divided into two display regions (first and second display regions R1 and R2), but for example, the first display unit 204 may be configured to be divided into three or more display regions.

INDUSTRIAL APPLICABILITY

The present invention relates to a vehicle information provision device using an on-board device and an external device, not only a meter for a vehicle displaying vehicle information but also a navigation device mounted on the vehicle, the multi-display device, and the like can be applied as the on-board device.

REFERENCE SIGNS LIST

101 VEHICLE INFORMATION PROVISION DEVICE
102 ON-BOARD DEVICE
103 EXTERNAL DEVICE
103a FIRST EXTERNAL DEVICE
103b SECOND EXTERNAL DEVICE
104 CONNECTION MEANS
200 DEVICE UNIT
202 FIRST CONTROL MEANS
204 FIRST DISPLAY UNIT (DISPLAY UNIT)
213 OPERATION MEANS
214 SOUND OUTPUT TERMINAL
215 ATTACHMENT/DETACHMENT MEANS
217 AMPLIFIER
218 DRIVER (SOUND-EMITTING BODY DRIVE CIRCUIT)
219 SPEAKER (SOUND-EMITTING BODY)
220 FIRST COMMUNICATIONS UNIT (COMMUNICATIONS UNIT)
252 SECOND CONTROL MEANS
260 SECOND COMMUNICATIONS UNIT
271 WIRELESS I/F (INTERFACE UNIT)
272 WIRELESS DECODER (DECODER)
281 WIRED I/F (INTERFACE UNIT)
282 WIRED DECODER (DECODER)
291 CONTROL UNIT
292 SELECTION UNIT
300 VEHICLE SPEED DISPLAY PORTION
310 SHIFT POSITION DISPLAY PORTION
320 FUEL REMAINING AMOUNT DISPLAY PORTION
330 DIRECTION INDICATION DISPLAY PORTION
340 FUEL CONSUMPTION DISPLAY PORTION
350 OUTSIDE TEMPERATURE DISPLAY PORTION
360 WARNING DISPLAY PORTION
370 NAVIGATION DISPLAY PORTION (EXTERNAL INFORMATION FOR THE VEHICLE)
380 OPERATION DISPLAY PORTION
M1 FIRST DISPLAY MODE
M2 SECOND DISPLAY MODE
R1 FIRST DISPLAY REGION
R2 SECOND DISPLAY REGION
S1 VIDEO SIGNAL
S2 SOUND SIGNAL

The invention claimed is:
1. A vehicle information provision device comprising:
an on-board device including a device unit including a display unit that displays various states of a vehicle as vehicle status information to a user and first control means that operates the display unit; and
a communications unit that communicates between the device unit and an external device that outputs external information for the vehicle to the device unit, wherein
the communications unit is configured to be connectable to the device unit through attachment/detachment means, and outputs a signal including at least either a video signal or an audio signal as the external information for the vehicle to the device unit, when the device unit is connected to the communications unit through the attachment/detachment means, the external device includes at least two external devices having communication interfaces which are different from each other,
when the communications unit is connected to one external device out of the at least two external devices, the communications unit includes at least two interface units, at least two decoders provided so as to correspond to the at least two interface units, and a selection unit that selects an output from outputs of the at least two decoders, and a control unit provided in the communications unit controls the selection unit, depending on one connected external device.

2. The vehicle information provision device according to claim 1, wherein the display unit has a first display region displaying a predetermined type of information out of the vehicle status information and a second display region displaying another type of information out of the vehicle status information, which is different from the predetermined type of information, when the first control means is connected to the communications unit through the attachment/detachment means, the first control means executes a first display mode for displaying the vehicle status information on the display unit and a second display mode for displaying the vehicle status information and the external information for the vehicle on the display unit, and when the first control means executes the second display mode, the first control means operates the display unit so as to display the external information for the vehicle in the second display region.

3. The vehicle information provision device according to claim 2, wherein during the execution of the second display mode, the first control means operates the display unit so as to display operation information associated with the operation of the external device in the second display region.

4. The vehicle information provision device according to claim 1, wherein if detecting operation information associated with an operation of the external device, output from a predetermined operation means, by the user operating the operation means, the first control means outputs the operation information to second control means provided in the external device through the communications unit, and the second control means operates the external device based on the operation information.

5. The vehicle information provision device according to claim 4, wherein the operation means is configured to perform at least either an operation of the device unit or an operation of the external device.

6. The vehicle information provision device according to claim 1, further comprising a sound-emitting body drive circuit connected between the device unit and a sound-emitting body, the sound-emitting body drive circuit including an amplifier and being configured to drive the sound-emitting body based on a sound signal from the communications unit.

7. The vehicle information provision device according to claim 1, wherein the control unit provided in the communications unit receives the vehicle status information through the device unit and the attachment/detachment means, and outputs the received vehicle status information to the second control means provided in the external device.

\* \* \* \* \*